US008890953B1

(12) United States Patent
Coley

(10) Patent No.: US 8,890,953 B1
(45) Date of Patent: Nov. 18, 2014

(54) OPTICAL-BASED SCENE DETECTION AND AUDIO EXTRACTION

(75) Inventor: Christopher Coley, Morgan Hill, CA (US)

(73) Assignee: Rawles LLC, Wilmington, DE (US)

( * ) Notice: Subject to any disclaimer, the term of this patent is extended or adjusted under 35 U.S.C. 154(b) by 687 days.

(21) Appl. No.: 13/169,547

(22) Filed: Jun. 27, 2011

(51) Int. Cl.
*H04N 7/18* (2006.01)
*H04N 5/232* (2006.01)
*G06K 9/00* (2006.01)

(52) U.S. Cl.
CPC . *H04N 7/18* (2013.01); *H04N 5/232* (2013.01)
USPC .......................................................... 348/143

(58) Field of Classification Search
None
See application file for complete search history.

(56) References Cited

U.S. PATENT DOCUMENTS

| 5,689,442 | A * | 11/1997 | Swanson et al. ............... 380/241 |
| 6,424,371 | B1 * | 7/2002 | Wen .............................. 348/153 |
| 7,015,954 | B1 * | 3/2006 | Foote et al. ................. 348/218.1 |
| 7,627,139 | B2 * | 12/2009 | Marks et al. ................... 382/103 |
| 7,961,946 | B2 * | 6/2011 | Hammadou ................... 382/181 |
| 8,570,320 | B2 * | 10/2013 | Izadi et al. ..................... 345/420 |
| 2006/0085831 | A1 * | 4/2006 | Jones et al. .................... 725/105 |
| 2006/0117362 | A1 * | 6/2006 | Jones et al. .................... 725/105 |
| 2009/0027498 | A1 * | 1/2009 | Owen et al. ................... 348/151 |
| 2009/0110372 | A1 * | 4/2009 | Morioka et al. .............. 386/117 |

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — Jay Patel
*Assistant Examiner* — Reza Aghevli
(74) *Attorney, Agent, or Firm* — Lee & Hayes, PLLC

(57) ABSTRACT

In analyzing a scene, a projection device may project an image onto surfaces or objects within the scene. The image may include user interface elements as well as structured light patterns for analyzing shapes of the surfaces and objects. The intensity of the reflection of the projected light may be monitored and used to derive an audio signal representing sound that occurs within the scene. The audio signal may be analyzed to detect and recognize user utterances and speech, which may be interpreted as commands.

20 Claims, 4 Drawing Sheets

OPTICAL-BASED SCENE DETECTION AND AUDIO EXTRACTION

BACKGROUND

Characterizing a scene within an environment and interacting with users within that environment may be aided by monitoring sound. Traditional microphones may be used for this purpose. In addition, microphone arrays can be used for directionality, making it possible to emphasize sounds originating from a particular direction. However, traditional techniques such as these are not always able to adequately detect and isolate sound sources.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described herein are systems and techniques for evaluating a given scene, such as a scene within a room or other environment. In some situations, it may be desired to evaluate physical characteristics of the scene, such as the shapes of surfaces and/or objects within the scene. It may also be desired to monitor sound within the scene, and to recognize and respond to different sounds such as speech.

In order to analyze shapes, a projector or other light source may be used to project a structured light pattern onto a surface or object. A camera at an offset position relative to the projector may then be used to capture the reflection of the structured light pattern. Distortions in the captured structured light pattern can be analyzed to determine contours of the surface or object, which can in turn be interpolated to represent the approximate three-dimensional shape of the surface or object.

The structured light pattern may comprise non-visible light in some embodiments. For example, the structured light may be formed by infrared illumination. Such infrared illumination may be superimposed over a visible image that is projected for viewing or consumption by a user within the scene.

In order to detect sound within the scene, an optical sensor or light sensor may be focused upon a portion of the scene or a portion of an area of an object within the scene that has been illuminated by the projector. The focused-upon portion of the scene or object will vibrate or oscillate in response to incident sound, which will in turn cause the effective intensity of reflected light to oscillate. The light sensor is configured to measure the intensity of the reflected light and to produce a signal representing the effective reflected light intensity over time. The signal is then filtered and demodulated to produce an audio signal or representation corresponding to sound that is incident upon the focused-upon portion of the scene or object. Sound recognition, including speech recognition, may be based upon this audio signal or representation.

In embodiments in which the structured light pattern is non-visible, the light sensor may be sensitive to this non-visible light. In other embodiments, the light sensor may be responsive to the light reflected by visible images that have been presented by the projector for viewing by a user. For example, the light sensor may be responsive to a focused-upon portion of a visible graphic or video that has been projected upon a wall or other surface. The focused-upon portion may in some cases be a portion of the image that is non-varying and thus subject to a constant or nearly-constant level of illumination. In other cases, projected variations in the focused-upon portion may be accounted for when monitoring and demodulating the signal produced by the light sensor.

Illustrative Environment and Architecture

Figure 1:
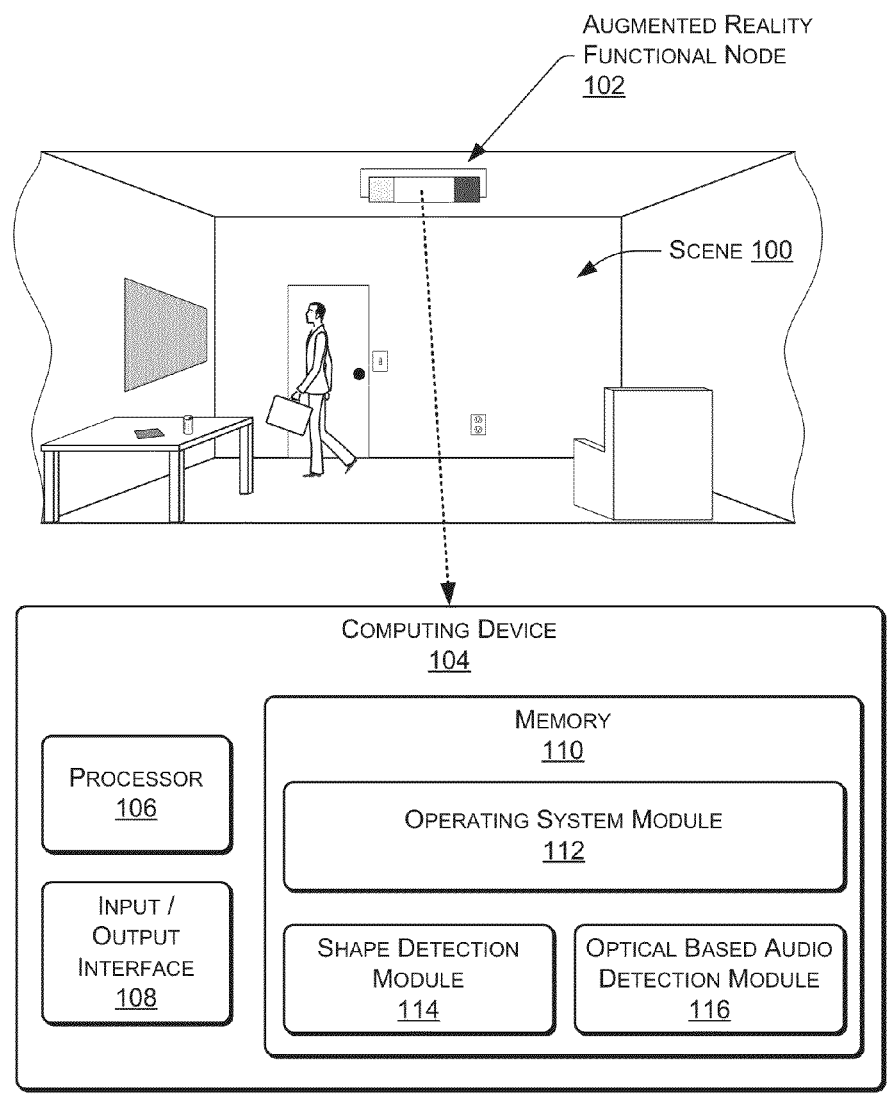
FIG. 1 shows an illustrative augmented reality environment which includes a scene with an augmented reality functional node and an associated computing device, configured to characterize the scene.

FIG. 1 shows an illustrative environment in which the described systems and techniques may be implemented. For purposes of this description, various components and methods will be illustrated in the context of an augmented reality system. However, similar functionality may also be provided in other environments.

The environment of FIG. 1 includes a scene 100 and an augmented reality functional node (ARFN) 102 with an associated computing device 104. In this illustration, the ARFN 102 is positioned approximately at the mid-ceiling of the scene 100, which in this example is within a room. The ARFN 102 may access additional resources, such as those on a local area network, or cloud resources accessible via a wide area network. In some implementations, multiple ARFNs 102 may be positioned in a room, scene, or environment.

The ARFN 102 couples to the computing device 104. This computing device may reside within the ARFN 102 or at another location coupled to the ARFN 102 via a wired or wireless network. The computing device 104 comprises a processor 106, an input/output interface 108, and a memory 110. The processor 106 may comprise one or more processors configured to execute instructions. The instructions may be stored in the memory 110, or in other memory accessible to the processor 106.

The input/output interface 108 may be configured to couple the computing device 104 to other components such as a projector and a camera, to other ARFNs 102, networks, other computing devices, and so forth. The coupling between the computing device 104 and the components may be via wire, fiber optic cable, wireless or other connections. Wireless connections as used herein include radio frequency, optical, ultrasonic, and magnetic signaling.

The memory 110 may include computer-readable storage media ("CRSM"), which may comprise any available physical media accessible by a computing device to implement instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Various modules such as instruction, datastores, and so forth may be stored within the memory 110 and configured to execute on the processor 106. An operating system module 112 may be configured to manage hardware and services within, and coupled to, the computing device 104 for the benefit of modules. Modules may be stored in the memory of the ARFN 102, storage devices accessible on the local network, or cloud storage accessible via a wide area network. Such modules may include modules for scene analysis, including spatial analysis, shape recognition, dimensional calculation, scene modeling, and so forth. Examples of such modules and of the general functionality of an ARFN are described in U.S. patent application Ser. No. 12/977,924, filed Dec. 23, 2010, entitled "Characterization of a Scene with Structured Light," which is hereby incorporated by reference. In general operation, these modules support the ARFN in generating augmented reality elements in concert with the physical environment within the scene 100. For example, the ARFN may be configured to project a virtual image onto a wall which tracks and follows the user who initiated the presentation of the image.

Among other modules, such as those described in the Patent Application mentioned above, the computing device 104 may have a shape detection module 114 and an optical-based audio detection module 116. The shape detection module 114 is configured to analyze shapes of objects within the scene 100, and may allow the ARFN 102 to recognize or identify different types of objects within the scene 100. The optical-based audio detection module 116 is configured to detect sound, such as utterances from users and other sounds that may be present within the scene 100. The audio detection module 116 measures the intensity or other properties of light reflected from objects or surfaces, to detect vibrations of the objects or surfaces resulting from nearby sound. Based on the detected vibrations, the audio detection module 116 produces an audio waveform signal or other audio representation, corresponding to sound waves that are incident upon the objects or surfaces within the scene 100.

Figure 2:
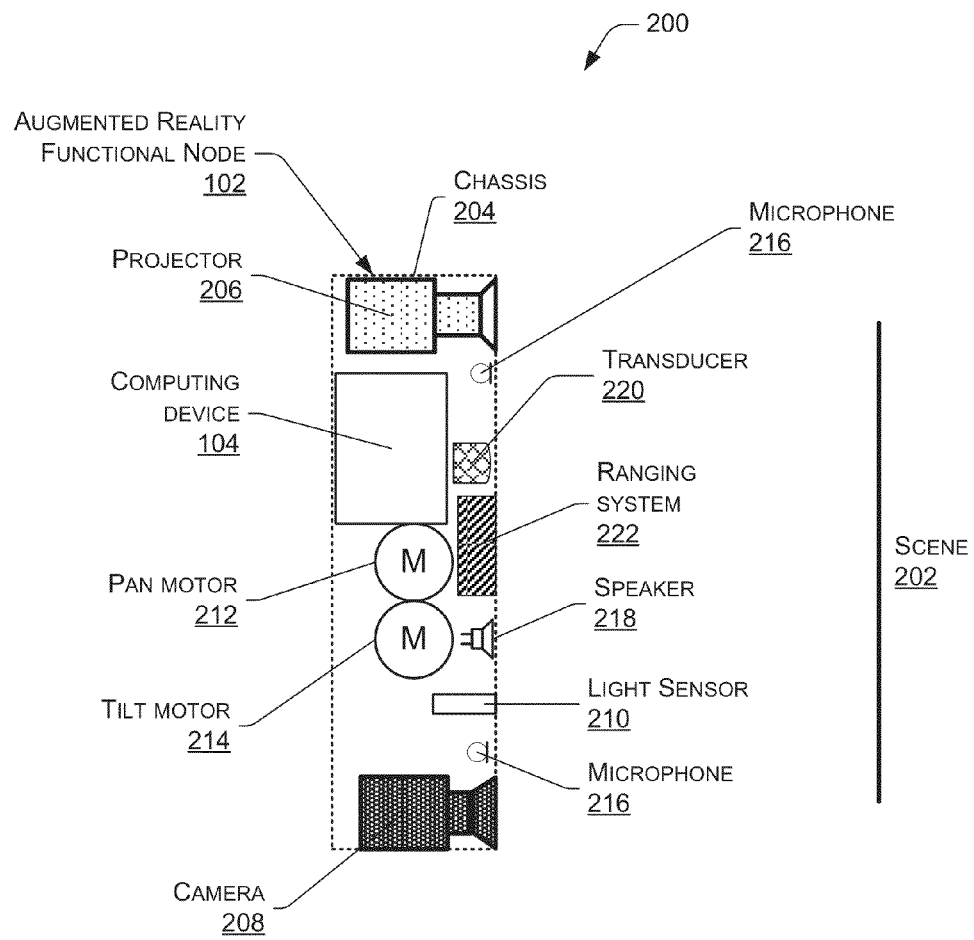
FIG. 2 shows the augmented reality functional node of FIG. 1 in more detail.

FIG. 2 shows an illustrative schematic 200 of the ARFN 102 and selected components in greater detail. The ARFN 102 is configured to scan at least a portion of a scene 202 and the objects therein. The ARFN 102 may also be configured to provide output.

A chassis 204 holds the components of the ARFN 102. Within the chassis 204 may be disposed a projector 206 that generates and projects images into the scene 202. These images may be visible light images perceptible to a user, non-visible light images imperceptible to users, or combinations thereof. The projector 206 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. In some implementations, a plurality of projectors 206 may be used.

A camera 208 may also be disposed within the chassis 204. The camera 208 is configured to captures images of the scene in visible light wavelengths, non-visible light wavelengths, or both. The field of view of the camera 208 may be variable. For example, an optical zoom of the camera may widen or narrow the camera field of view. In some implementations a plurality of cameras 208 may be used.

In some embodiments, the ARFN 102 may also have a directional light sensor 210. The light sensor may sense reflected light from an area that has been illuminated by the projector 206. The light sensor 210 in some cases may have a field of view that is smaller than that of the projector 206. Furthermore, depending on implementations details, it may have a variable field of view. The light sensor 210 may be a single pixel light sensor, or may have multiple pixels or sensing regions. In some embodiments, the light sensor 210 may be movable relative to the projector 206, under control of the computing device 104, to point at different regions of an image that has been projected by the projector 206.

The light sensor 210 may be used in conjunction with the audio detection module 116. Specifically, the audio detection module 116 may use the light sensor 210 to monitor variations in the intensity of light that is reflected from objects or surfaces with the scene 100. The audio detection module may use this information to reconstruct or detect sound that is present within the scene 100.

The light sensor 210 may be responsive to visible light, to non-visible light such as infrared, or to both.

The chassis 204 may be mounted with a fixed orientation or be coupled via an actuator to a fixture such that the chassis 204 may move. Actuators may include piezoelectric actuators, motors, linear actuators, and other devices configured to displace or move the chassis 204 or components therein such as the projector 206 and/or the camera 208. The actuator may comprise a pan motor 212, tilt motor 214, and so forth. The pan motor 212 is configured to rotate the chassis 204 in a yawing motion. The tilt motor 214 is configured to change the pitch of the chassis 204. By panning and/or tilting the chassis 204, different views of the scene may be acquired.

One or more microphones 216 may be disposed within the chassis 204, or elsewhere within the scene. These microphones 216 may be used to acquire input from the user, for echolocation, location determination of a sound, or to otherwise aid in the characterization of and receipt of input from the scene. Such microphones may provide for the detection of sound within the scene 100, and may also be used to calculate the positions of speakers within a room, by comparing audio signals from microphones located at different places within the scene. The sound detection and monitoring capabilities of the optical-based audio detection module 116 may be used either to supplement microphones 216, or in place of microphones 216.

One or more speakers 218 may also be present to provide for audible output. For example, the speakers 218 may be used to provide output from a text-to-speech module or to playback pre-recorded audio.

A transducer 220 may be present within the ARFN 102, or elsewhere within the environment, and configured to detect and/or generate inaudible signals such as infrasound or ultrasound. These inaudible signals may be used to provide for signaling between accessory devices and the ARFN 102.

A ranging system 222 may also be provided in the ARFN 102. The ranging system 222 is configured to provide distance information from the ARFN 102 to a scanned object or set of objects. The ranging system 222 may comprise radar, light detection and ranging (LIDAR), ultrasonic ranging, stereoscopic ranging, and so forth. In some implementations the transducer 220, the microphones 216, the speaker 218, or a combination thereof may be configured to use echolocation or echo-ranging to determine distance and spatial characteristics.

In this illustration, the computing device 104 is shown within the chassis 204. However, in other implementations all or a portion of the computing device 104 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN 102 on the local area network, cloud resources accessible via a wide area network connection, or a combination thereof.

In other implementations the components of the ARFN 102 may be distributed in one or more locations within the scene. As mentioned above, microphones 216 and speakers 218 may be distributed throughout the scene. The projector 206 and the camera 208 may also be located in separate chassis 204.

Shape Detection

Figure 3:
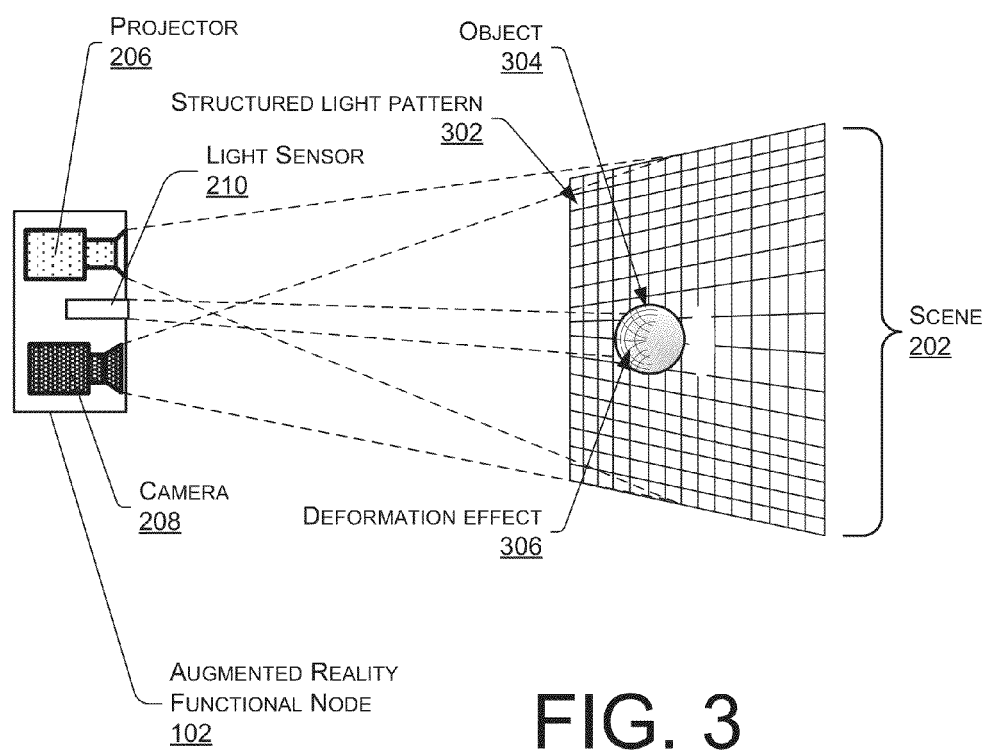
FIG. 3 illustrates the augmented reality functional node projecting a structured light pattern on a scene and receiving a corresponding image of the scene.

FIG. 3 illustrates a structured light pattern 300 impinging on the scene 202. In this illustration, the projector 206 within the ARFN 102 projects a structured light pattern 302 onto the scene 202. In some implementations a sequence of different structured light patterns 302 may be used. In other implementations, other devices such as general room lighting may generate structured light patterns. A light fixture, bulb, and so forth may be configured such that emitted light contains one or more modulated structured light patterns 302. For example, two structured light patterns may be presented, each at a different non-visible wavelength within the structure of an incandescent bulb.

The cameras 208 used to detect the structured light may also be incorporated into bulbs or assemblies suitable for installation in existing light fixtures. These assemblies may be configured to communicate with the computing device 104 wirelessly or via transmission of a signal via the household electrical wiring. In some implementations, the assembly may provide pre-processing of input prior to sending data along to the computing device 104.

The structured light pattern 302 may be in wavelengths that are visible to the user, non-visible to the user, or a combination thereof. The structured light pattern 302 is shown in this example as a grid for ease of illustration and not as a limitation. In other implementations other patterns, such as bars, dots, pseudorandom noise, and so forth may be used. Pseudorandom noise (PN) patterns are useful as structured light patterns because a particular point within the PN pattern may be specifically identified. A PN function is deterministic in that given a specific set of variables, a particular output is defined. This deterministic behavior allows the specific identification and placement of a point or block of pixels within the PN pattern. In some implementations, a plurality of structured light patterns 302 may be used to image the scene. These may include different PN patterns, geometric shapes, and so forth.

An object 304 is shown positioned between the projector 206 and a wall in the scene 202. Inspection of the object 304 from the perspective of the camera 208 shows a deformation effect 306 of the structured light pattern 302 as it interacts with the curved surface of the object 304. The deformation of the structured light pattern 302 can be analyzed using known structured light analysis techniques to determine the shape of the object 304. In some implementations other effects, such as dispersion of the structured light pattern 302 may be used to provide information on the topology of the scene.

In operation, the projector 206 projects the structured light pattern 302 and the camera 208 captures the reflected image of the structured light pattern. The projector 206 and the camera 208 may have similar or overlapping fields of view, as indicated by the dashed lines extending from each of these components. However, because of the lateral offset between the projector 206 and the camera 208, three-dimensional objects within the scene 202 will cause the structured light pattern as captured by the camera 208 to be deformed relative to the projected image. The shape detection module 114 is responsive to the difference between the projected image and the reflected image to determine shapes of three-dimensional objects within the scene 202. Multiple cameras 208 may be used in some embodiments for this purpose.

As mentioned above, the structured light pattern 302 may be projected using light that is visible to the user, non-visible to the user, or a combination of the two. Non-visible light offers the advantage of allowing the structured light pattern 302 to be projected onto the scene and to be undetectable to the user. Non-visible light, however, may require special equipment or adaptations to the equipment to generate and modulate the non-visible light. For example, an image projector may incorporate a color wheel with segments configured to pass infrared light as well as visible light wavelengths.

The structured light pattern 302 may also be generated using wavelengths visible to the user. Visible wavelength structured light allows the use of existing image projection and image acquisition hardware. Visible wavelength structured light also allows for color characterization of objects. For example, primary color structured light patterns may be used to determine absorption and reflection of the primary color on objects within the scene. This color characterization may be utilized in some implementations to color correct for projection of an image onto a surface. For example, an image projected by the ARFN 102 onto a yellow writing pad may be color corrected to account for the yellow color of the pad.

The structured light pattern may be embedded within an image that is being presented for viewing by a user. For example, such an image may be projected by the projector 206 using visible light, while the projector 206 simultaneously projects the structured light pattern using non-visible light. The camera 208 may in this situation be responsive to the projected non-visible light, or may have the ability to capture separate images of both non-visible projections and visible projections. The images of non-visible projections can then be used by the shape detection module 114 for shape detection, while the images of visible projections can be used for other purposes, by other components of the ARFN 102.

Note that certain embodiments may not implement shape detection or may implement shape detection using techniques that do not involve the projection and/or analysis of structured light.

Optical-Based Audio Detection

The optical-based audio detection module 116 may detect audio in response to light intensity signals provided by or derived from the camera 208 and/or the directional light sensor 210. Generally, the ARFN 102 may be configured to identify a suitable object within the scene, at a location from which sound is to be detected. The projector 206 may be directed to illuminate the object or a portion of the object, using visible or non-visible light. The projector may project a visible image on the object for viewing by a user, in addition to a non-visible component such as a structured light pattern for analyzing shape of the object. Alternatively, the projected image may be entirely visible or entirely non-visible, and may or may not contain a structured light pattern.

The light sensor 210 may then be directed toward or focused upon the object or a portion of the object, to monitor reflected light from the object. In certain embodiments, the light sensor 210 may have a relatively narrow field of view in comparison to those of the projector 206 and camera 208, as indicated by the dashed lines extending the light sensor 210.

The light sensor 210 may monitor visible light, non-visible light, or both. Light intensity variations are assumed to be due at least in part to physical displacement of the object or surface from which the light is being reflected, which in turn is due to sound waves incident upon the object or surface. Frequency-based filtering and/or other signal processing may be used to emphasize frequencies representing human speech or other audible or inaudible sound frequencies. Processing such as this may be performed in digital and/or analog domains.

The optical-based audio detection module 116 is responsive to light intensity information received from the light sensor 210, or from signal processing circuitry responsive to the light sensor 210. The light intensity information is used as the basis for deriving an audio signal that represents audio within the scene 100. Specifically, the light intensity signal may be demodulated to produce a waveform or other signal corresponding to audio within the scene 100.

As mentioned above, the audio detection module 116 may receive reflected light intensity information from the camera 208 rather than from a light sensor 210. Multiple pixels captured by the camera 208 may be averaged to form a reflected light signal that is representative of reflected light from a particular area of the scene 202.

Example Processes

Figure 4:
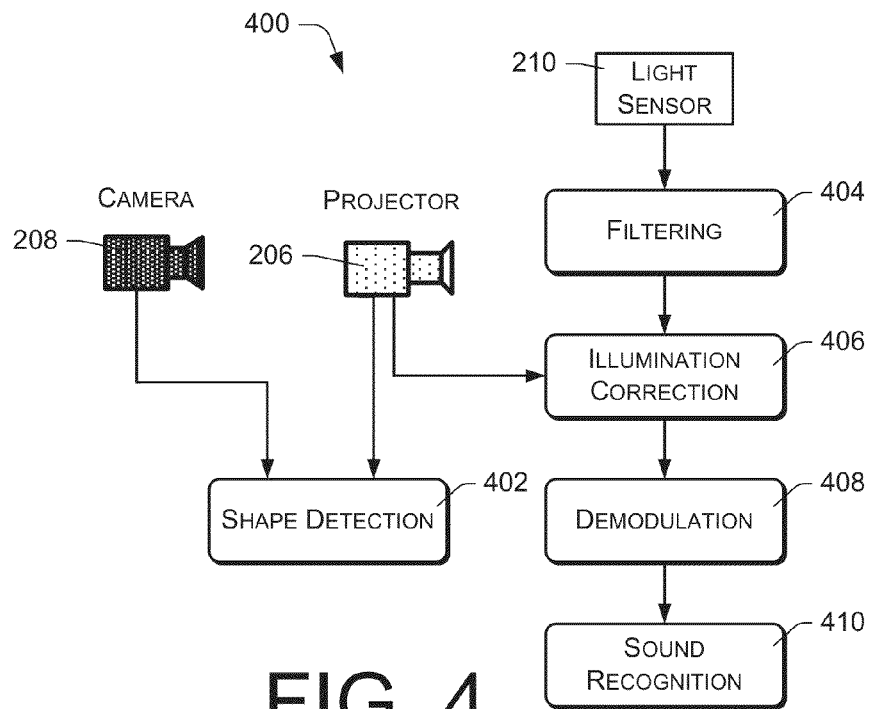
FIG. 4 illustrates an example of a process for evaluating shapes and sounds within an environment.

FIG. 4 illustrates an example of this process, indicated generally by the reference numeral 400. The projector 206 may be used to illuminate a surface or area of a scene and the camera 208 may be used to capture one or more images of the illuminated scene. In this embodiment, the projector 206 is configured or controlled to project an image that includes a structured light pattern, which may be visible or non-visible. The structured light pattern may be in addition to a visible projected image such as a menu, a picture, a video, a plurality of symbols, or some other type of image or images that are rendered in conjunction with the scene for viewing by a user.

The camera 208 may be configured to capture an image of the scene. More specifically, the camera 208 may be controlled to capture an image of the structured light pattern projected by the projector 206. Thus, the camera may be sensitive to visible or non-visible light, depending on the nature of the projected structured light pattern. In some cases, the camera may be dynamically configurable to respond to visible light, non-visible light, or both visible and non-visible light.

An action 402 may comprise detecting shapes of one or more objects within the scene, based upon comparing the structured light pattern as projected by the projector 206 with the reflection of the structured light pattern as captured by the camera 208.

The light sensor 210 may also be directed toward the area or surface illuminated by the projector 206. In some embodiments, the light sensor 210 may be directed to a sub-region or sub-area within the overall projection area. For example, the light sensor 210 may have a field of view corresponding to an object within the scene, or to a portion of an object within the scene. In many situations, the field-of-view of the light sensor 210 will be smaller than that of the projector 206, but will nonetheless encompass a plurality of illuminated image pixels.

The light sensor 210 may be responsive to the intensity of visible light, non-visible light, or both. In some embodiments, the light sensor may be respond to the non-visible structured light pattern projected by the projector 206. In these embodiments, the light sensor 210 may have a field-of-view that encompasses multiple elements of the structure light pattern. Thus, if the structured light pattern comprises a series of lines, the field of view of the light sensor 210 may encompass a plurality of such lines or portions of multiple lines.

The light sensor 210 is responsive to the intensity of reflected light within its field of view to produce an intensity signal that varies in accordance with the intensity of the reflected light. This signal may be an electronic waveform or some other type of signal, such as a digital signal.

Note that in some embodiments the camera 208 may be used as the light sensor 210. In these embodiments, a group of camera pixels may be averaged or otherwise combined to produce a signal representing the light reflected from an object within the scene. The group of pixels may be chosen dynamically to correspond to a particular object within the scene from which it is desired to detect sound, or to a focused-upon portion of the object.

The signal from the light sensor 210 (or camera 208) oscillates in accordance with vibrations of the surface upon which the light sensor 210 is focused. The oscillating signal may be processed or filtered at an action 404 to remove oscillation frequencies that are not relevant to sound detection. Furthermore, at an action 406, the signal may be processed to compensate for variations that result from variations in the illuminated image produced by the projector 206. This may be needed, for example, in situations in which the projector is presenting a variable image such as a video, and in which the light intensity measured by the light sensor 210 varies depending on the brightness of the currently projected image. In other situations, such as where the light sensor 210 is responsive to non-visible light, the illumination correction 406 may not be needed. Furthermore, it may be that any variation in projected images occurs at a relatively low frequency, which is easily filtered at action 404.

At an action 408, the light intensity signal is demodulated to produce a waveform or signal corresponding to sound that is incident upon the focused-upon object or area. The signal may be represented by an analog waveform or by a digital stream. Various types of filtering and signal processing may additionally be performed in the analog and/or digital domains, depending on circumstances and the specific types or frequencies of sound that are being detected, in order to recover usable sound representations.

The demodulated signal is further processed at an action 410 to perform sound recognition. Such sound recognition may be performed using various available techniques, and may include speech recognition and speech-to-text functionality.

Figure 5:
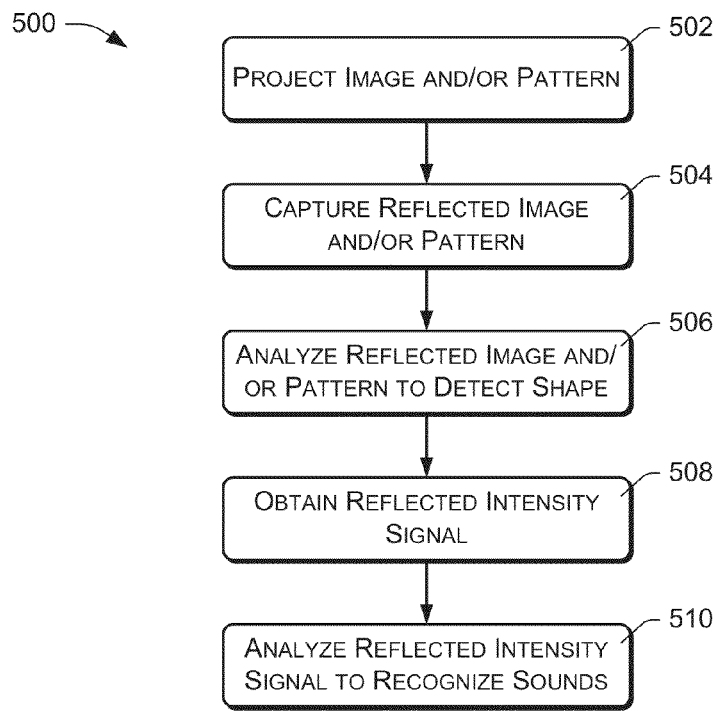
FIG. 5 illustrates another example of a process for evaluating shapes and sounds within an environment.

FIG. 5 shows another example of a process 500 for detecting and/or evaluating an environment, and for interacting with a user within the environment. The process 500 may be used in conjunction with the system described with reference to FIGS. 1-3, as well as with different types of equipment and architectures.

An action 502 comprises projecting an image and or structured light pattern onto surfaces and objects within an environment. The image may include a visible image intended for viewing by a user within the environment. The visible image may include various types of graphics and representations such as might be used in creating a virtual environment, as well as pictures, drawings, text, video, user interface elements, and so forth.

The image may additionally or alternatively include a non-visible image intended for some type of analytic purpose rather than for viewing by a user. For example, the image may include a non-visible structured light pattern that is to be observed and analyzed to detect shapes, contours, and/or other properties of surfaces and objects within the environment.

An action 504 comprises capturing the reflection of the projected image, as it is reflected by surfaces and objects within the environment. The reflection may be captured in order to analyze the environment and/or to detect objects within the environment. In some embodiments, the action 504 may include capturing non-visible image reflections, such as capturing a structured light pattern that has been projected using infrared or other non-visible light. The action 504 may include capturing a still image of a portion of the environment that includes the projected image, or a sequence of images that form a video of the environment.

An action 506 comprises analyzing the reflected image and/or pattern to determine characteristics of surfaces or objects within the environment. In the described embodiment, a reflected structured light pattern is analyzed to detect or determine shapes of surfaces and objects within the environment. Specifically, the action 506 may evaluate the distortion or deformation of a projected image caused by objects within an environment, and may derive shapes as a function of the distortion or deformation.

An action 508 comprises obtaining or deriving a reflected intensity signal, representing the intensity over time of the reflection of the image or a portion of the image projected in action 502. More specifically, the reflected intensity signal may represent the averaged reflected intensity of a portion of the projected image, such as the portion of the projected image that coincides with a particular object or object portion that is encompassed by the projected image. Furthermore, the reflected intensity signal may be based on visible and/or non-visible components of the projected image. In some embodiments, the reflected intensity signal may be derived from a non-visible structured light pattern that has been projected into the environment.

An action 510 comprises analyzing the reflected intensity signal to recognize sounds. This may include recognizing spoken utterances of a user and may also include recognizing user speech. In some embodiment, the action 510 may include recognition of other sounds such as music, footsteps, and sounds generated from the interaction of a user with one or more object within the user's environment.

The detected sound, which as described above may include specific speech and/or utterances of a user, may be used in conjunction with a user interface. For example, a system such as that shown in FIGS. 1-3 may project user interface elements onto surfaces within the environment, and may respond to user commands detected in the action 510. In certain situations, the user interface may include a projected icon or graphic element that is recognizable to users as a microphone. The user in these situations would be directed to speak "into" the projected "virtual" microphone, and the speech would be detected by monitoring the reflected light from the projected microphone image.

CONCLUSION

Note that the various techniques described above are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An augmented reality system comprising:
   one or more processors;
   memory;
   a projector that projects a structured light pattern onto upon objects that reflect the structured light pattern;
   a camera that captures the structured light pattern reflected from the objects;
   a shape detection module stored in the memory and executable by the one or more processors, the shape detection module being responsive to the reflected structured light pattern captured by the camera to determine shape properties of the objects; and
   an audio detection module stored in the memory and executable by the one or more processors, the audio detection module being responsive to one or more variations in the reflected structured light pattern, due to movement associated with one or more of the objects, to recognize user utterances.

2. The augmented reality system of claim 1, wherein the audio detection module obtains the reflected structured light pattern from the camera.

3. The augmented reality system of claim 1, wherein the audio detection module is further responsive to intensity of the reflected structured light pattern to recognize the user utterances.

4. The augmented reality system of claim 1, wherein the audio detection module is further responsive to intensity of the reflected structured light pattern that is reflected from an area of one of the objects to recognize the user utterances.

5. The augmented reality system of claim 1, further comprising:
   an optical sensor that is responsive to reflected light intensity over an area of one or more of the objects to produce an intensity signal; and
   wherein the audio detection module is responsive to the intensity signal to recognize the user utterances.

6. The augmented reality system of claim 1, wherein the audio detection module is further responsive to the reflected structured light pattern to recognize speech.

7. The augmented reality system of claim 1, wherein the audio detection module is further responsive to an averaged intensity of the reflected structured light pattern to recognize the user utterances.

8. The augmented reality system of claim 1, wherein the audio detection module is further responsive to time-based intensity modulations of the reflected structured light pattern to recognize the user utterances.

9. A method of interacting with a user, comprising:
   projecting by a projector a structured light pattern onto a surface;
   capturing by a camera the structured light pattern reflected from the surface;
   detecting by a shape detection module stored in a memory and executed by one or more processors, shape properties of the surface in response the reflected structured light pattern captured by the camera;

converting by an audio detection module one or more variations in the reflected structured light pattern, due to movement associated with the surface, to an audio representation.

10. The method of claim 9, wherein the projected image comprises an image that is recognizable to the user as a microphone.

11. The method of claim 9, further comprising recognizing spoken utterances of the user based on the audio representation.

12. The method of claim 9, further comprising recognizing speech of the user based on the audio representation.

13. The method of claim 9, further comprising responding to spoken commands of the user based on the audio representation.

14. The method of claim 9, wherein the projected image includes a non-visible component and the reflected intensity is captured from the non-visible component of the projected image.

15. The method of claim 9, wherein the projected image includes a non-perceivable structured light pattern and the reflected intensity is captured from the non-perceivable structured light pattern.

16. A method of environment detection, comprising:
projecting a light pattern onto objects within an environment;
capturing the light pattern as it is reflected from the objects;
analyzing the captured reflected light pattern to determine shape properties of the objects; and
analyzing one or more variations in the captured reflected light pattern including analyzing time-based intensity modulations of at least a portion of the captured reflected light pattern, due to movement associated with one or more of the objects, to detect sound within the environment.

17. The method of claim 16, wherein the projected light pattern comprises non-visible light.

18. The method of claim 16, further comprising recognizing user utterances based on the detected sound.

19. The method of claim 16, further comprising recognizing speech based on the detected sound.

20. The method of claim 16, wherein analyzing the captured reflected light pattern to determine shape properties of the objects comprises analyzing deformation of the captured reflected light pattern.

* * * * *